(12) United States Patent
Decraene (10) Patent No.: US 10,666,550 B2
(45) Date of Patent: May 26, 2020

(54) METHOD FOR COMBATING MICRO-LOOPING DURING THE CONVERGENCE OF SWITCHING TABLES

(71) Applicant: Orange, Paris (FR)

(72) Inventor: Bruno Decraene, Vanves (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/781,931

(22) PCT Filed: Dec. 6, 2016

(86) PCT No.: PCT/FR2016/053234
§ 371 (c)(1),
(2) Date: Jun. 6, 2018

(87) PCT Pub. No.: WO2017/098140
PCT Pub. Date: Jun. 15, 2017

(65) Prior Publication Data
US 2018/0359175 A1 Dec. 13, 2018

(30) Foreign Application Priority Data
Dec. 7, 2015 (FR) ..................... 15 61950

(51) Int. Cl.
*H04L 12/705* (2013.01)
*H04L 12/753* (2013.01)
(Continued)

(52) U.S. Cl.
CPC .............. *H04L 45/18* (2013.01); *H04L 45/22* (2013.01); *H04L 45/28* (2013.01); *H04L 45/48* (2013.01); *H04L 2212/00* (2013.01)

(58) Field of Classification Search
CPC ......... H04L 45/18; H04L 45/22; H04L 45/28; H04L 45/48
See application file for complete search history.

(56) References Cited

U.S. PATENT DOCUMENTS 8,072,879 B2 * 12/2011 Vasseur ..................... H04J 3/14
370/225
8,274,989 B1 * 9/2012 Allan ...................... H04L 45/16
370/432

(Continued)

FOREIGN PATENT DOCUMENTS

FR       2906429 A1    3/2008
WO    03071745 A1    8/2003

OTHER PUBLICATIONS

English translation of the Written Opinion of the International Searching Authority dated Mar. 14, 2017, for corresponding International Application No. PCT/FR2016/053234, filed Dec. 6, 2016.

(Continued)

*Primary Examiner* — Chi H Pham
*Assistant Examiner* — Weibin Huang
(74) *Attorney, Agent, or Firm* — David D. Brush; Westman, Champlin & Koehler, P.A.

(57) ABSTRACT

A method for determining a termination point of at least one tunnel or segment in a packet switching network. The network includes a set of routers and links between them, the routers and links forming a previous network topology, a transit router receiving packets intended for an output router, an event modifying the previous topology into a subsequent network topology, and a backup path between the transit router and the output router being calculated for the subsequent topology. The method includes calculating, prior to the event, for each router, an initial tree based on the previous topology, which has as a root the router and has as branches paths of minimum cost between the root and the other routers. A termination point of a tunnel or segment is obtained to prevent packets transiting between the start router and the output router from entering into a micro-loop caused by the event.

14 Claims, 4 Drawing Sheets

(51) Int. Cl.
*H04L 12/703* (2013.01)
*H04L 12/707* (2013.01)

(56) References Cited

U.S. PATENT DOCUMENTS

| | | | | |
|---|---|---|---|---|
| 9,059,928 | B2* | 6/2015 | Beheshti-Zavareh | ............... H04L 45/12 |
| 9,185,027 | B2* | 11/2015 | Beheshti-Zavareh | ............... H04L 45/22 |
| 9,270,426 | B1* | 2/2016 | Atlas | ............... H04W 72/0466 |
| 9,722,916 | B2* | 8/2017 | Sivabalan | ............... H04L 45/28 |
| 2007/0011284 | A1* | 1/2007 | Le Roux | ............... H04L 45/28 709/223 |
| 2008/0205294 | A1* | 8/2008 | Brune | ............... H04J 3/0679 370/254 |
| 2010/0020679 | A1 | 1/2010 | Decraene et al. | |
| 2012/0020207 | A1* | 1/2012 | Corti | ............... H04L 45/02 370/225 |
| 2015/0372902 | A1* | 12/2015 | Giorgetti | ............... H04L 45/64 370/219 |

OTHER PUBLICATIONS

Ross W. Callon, "Use of OSI IS-IS for Routing in TCP/IP and Dual Environments", RFC 1195, Dec. 1990.
C. Perkins, "IP Encapsulation within IP", RFC 2003, Oct. 1996.
J. Moy, "OSPF Version 2", RFC 2328, Apr. 1998.
W. Townsley et al., "Layer Two Tunneling Protocol 'L2TP'", RFC 2661, Aug. 1999.
D. Farinacci, "Generic Routing Encapsulation (GRE)" RFC 2784, Mar. 2000.
E Rosen et al., "Multiprotocol Label Switching Architecture" RFC 3031, Jan. 2001.
J. Lau et al., "Layer Two Tunneling Protocol—Version 3 (L2TPv3)" RFC 3931, Mar. 2005.
L. Andersson et al., "LDP Specification" RFC 5036, Oct. 2007.
R. Coltun et al., "OSPF for IPv6", RFC 5340, Jul. 2008.
S. Hedge et al., "Micro-loop avoidance using SPRING draft-hegde-rtgwg-microloop-avoidance-using-spring-00", Oct. 18, 2015.
H. Gredler et al., "North-Bound Distribution of Link-State and TE Information using BGP draft-ietf-idr-ls-distribution-12", Oct. 4, 2015.
S. Previdi et al., "IS-IS Extensions for Segment Routing draft-ietf-isis-segment-routing-extensions-05", Jun. 30, 2015..
P. Psenak et al., "OSPFv3 Extensions for Segment Routing draft-ietf-ospf-ospfv3-segment-routing-extensions-03", Jun. 26, 2015.
P. Psenak et al., "OSPF Extensions for Segment Routing draft-ietf-ospf-segment-routing-extensions-05", Jun. 26, 2015.
C. Filsfils et al., "Segment Routing Architecture draft-ietf-spring-segment-routing-06", Oct. 14, 2015.
International Search Report dated Mar. 14, 2017, for corresponding International Application No. PCT/FR2016/053234, filed Dec. 6, 2016.
Written Opinion of the International Searching Authority dated Mar. 14, 2017, for corresponding International Application No. PCT/FR2016/053234, filed Dec. 6, 2016.

* cited by examiner

METHOD FOR COMBATING MICRO-LOOPING DURING THE CONVERGENCE OF SWITCHING TABLES

CROSS-REFERENCE TO RELATED APPLICATIONS

This Application is a Section 371 National Stage Application of International Application No. PCT/FR2016/053234, filed Dec. 6, 2016, which is incorporated by reference in its entirety and published as WO 2017/098140 A1 on Jun. 15, 2017, not in English.

1. FIELD OF THE INVENTION

The patent application is in the field of data packet routing in a telecommunication network comprising nodes, each node having at least partial knowledge of the network topology.

2. STATE OF THE ART

More particularly, the invention is based, without being limited thereto, in the context of IP (Internet Protocol) and MPLS (Multi-Protocol Label Switching) networks, formed by routers conveying IP or MPLS packets and routing these packets from router to router, along a path up to their destinations.

When the state of the network is modified, affecting a link between two routers, i.e. following a link failure, a link re-establishment, or a change of the metric of a link, which metric is used by the routers for the calculation of routes, each router modifies its switching tables (FIB: Forwarding Information Base) in an uncoordinated manner. Specifically, during rerouting operations which follow such a link modification, all the routers do not enter the new routes in their switching table at exactly the same time. Consequently, temporary switching loops, or "micro-loops", can arise between a router still using a former route, and a neighboring router already using the new route.

Figure 1:
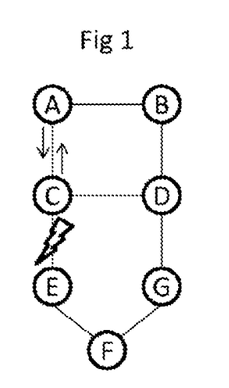
FIG. 1 schematically presents the phenomenon of a micro-loop among several routers.

This micro-loop phenomenon is illustrated by FIG. 1, in which the router A transmits to C a packet for which the final destination is the router E. The router C, detecting a failure of the link between itself and the router E, updates its routing table and decides to reroute the packet via a new route passing through the routers A, B, D, G, F, in order that the packet may reach its destination at the router E despite the failure. But until the router A has updated its own routing table to reach the destination E, the router A makes the packet turn back, sending it back to the router C. The packet therefore keeps going back and forth between the routers A and C, until the routing tables of both routers have been updated, creating the micro-loop. It is to be noted that depending on the topologies, micro-loops can involve a number of routers greater than two. For example, if the routing table of the router A has definitely been updated but not that of the router D, the router D can decide to send the packet to the router C in order to reach the router E. The router C will then send the packet to the router A again, and a loop is thus formed between the routers A, B, D and C.

The document "draft-hegde-rtgwg-microloop-avoidance-using-spring-00", published on Oct. 18, 2015 on the IETF (Internet Engineering Task Force) website, describes a method according to which the routers await the convergence to the rerouting topology, i.e. each waits until all have accomplished their individual calculation of the new routes before transmitting their traffic on the new routes. This solution has several drawbacks. First of all it assumes that all the destinations are covered by an emergency rerouting mechanism called FRR (Fast ReRoute) used by the packets in transit while awaiting convergence. Secondly, this method introduces a rerouting delay greater than or equal to the longest of the recalculation delays for all the routers, thereby delaying the use of the optimal path for the traffic. Lastly, this method does not routinely work if, before the convergence, another failure affecting a link other than the link already affected occurs.

One of the aims of the invention is to remedy these drawbacks of the prior art.

3. DESCRIPTION OF THE INVENTION

The invention improves the situation using a method for determining a termination point of at least one tunnel or tunnel segment in a packet switching network, the network comprising a set of routers and links between them, each link having an associated cost, the set of routers and the links forming a network topology referred to as "previous", a transit router included in the set receiving packets destined for an exit router included in the set, an event modifying the previous topology to a network topology referred to as "subsequent", a backup path between the transit router and the exit router being calculated for the packets on the basis of the subsequent topology, the method comprising the following step, prior to the event:

for each of the routers in the set, calculation of a tree referred to as "initial", on the basis of the previous topology, said initial tree having as root said each of the routers and having as branches paths of minimum cost between the root and the other routers in the set, the method additionally comprising at least one cycle of the following steps, after the event:

selection of a router on the backup path, referred to as "start router", from the start router, to the exit router along the backup path, identification of a router, referred to as "last common router", for which all the links and routers including itself, between the start router and itself, are common to the backup path and to the initial tree associated with the start router, and, if this last common router is different from the start router, determination of the termination point of the tunnel or tunnel segment as being the identified last common router, the tunnel or tunnel segment being intended to save the packets that are transiting between the start router and the identified last common router from entering a micro-loop caused by the event.

A tunnel or a tunnel segment in a packet switching network provides for avoiding, with respect to the encapsulated packets, the consultation of the switching tables of the routers that the tunnel passes through, except for the transit router in which the packets are encapsulated and the end router in which they are de-encapsulated. According to the encapsulation technique used by the transit router, for example depending on whether an IP or MPLS tunnel is used, or depending on whether segment routing is used, the determination method according to the invention provides for, respectively, either encasing, one in the other, tunnels having different termination points, or concatenating, one behind the other, tunnel segments having different termination points.

A switching table of a router is consulted only on the basis of the tunnel packet header, the other encapsulated headers remaining hidden, and only for one single destination: the destination of the tunnel. By virtue of the determination method according to the invention, the destination is chosen in a specific manner in order that this destination is not impacted by the failure, or more generally, by the topology change. Its routing does not change and therefore this destination does not enter a micro-loop on the path of this tunnel.

Such a tunnel can therefore be used equally before the event or after the event, and this is the case even before the process of convergence of the switching tables of the routers, triggered by the event, is terminated. Furthermore, if the event is a link or router or prefix failure, or an increase in a metric of a link or prefix, the method can determine a tunnel or a tunnel segment which avoids switching loops, or micro-loops, even when a second event occurs before the initial trees have been recalculated on the basis of the most recent topology.

By cost, it is thus necessary to understand a metric for quantifying a degree of ineffectiveness associated with the use of the link. In general, the cost is related to the distance between two routers but in some cases the cost can be different for the same section between two routers, depending on the direction followed. For this reason, a "link" in the context of the invention is unidirectional, and its cost is associated with only one of the two directions: the one followed by the packets in their routing between the transit router and the exit router.

According to a preferred embodiment of the invention, the steps of the determination method are implemented by the transit router.

According to an alternative embodiment, these steps can be implemented by network control equipment, which, without necessarily being a router, has visibility of the network topology as if it were a router. This is the case for example of an SDN (Software Defined Network) controller.

According to an aspect of the invention, the backup path is of minimum cost.

By virtue of this aspect, the cost of the backup path is minimized, which is in general the objective sought, and therefore the optimal route. Furthermore, the tunnels used also follow the lowest cost path, therefore by using the same metric for the backup path as the tunnels used, there is a greater chance that the tunnels naturally follow the path desired, which can also minimize the number of tunnels to be used.

According to an aspect of the invention, the start router selected during the first cycle is the transit router.

By virtue of this aspect, the determined tunnels can commence from the transit router.

According to an aspect of the invention, the start router selected during the first cycle is a router adjacent to the transit router on the backup path.

The routing on the link between the transit router and its immediate neighbor on the backup path is not affected by the failure, and it is therefore not necessary to include this link in the tunnel. By virtue of this aspect it is therefore possible to shift by one router hop the start of the tunnel to be determined, which can allow it to end a little further along, which can minimize the total number of tunnels to be determined and needed along the entire backup path.

According to an aspect of the invention, the selected start router is the termination point determined during the previous cycle, if the cycle is not the first.

By virtue of this aspect it is possible to determine tunnels, which, when they are encapsulated, one in the other, on the backup path, allow the packets to be caused to transit across an uninterrupted sequence of tunnels. The determination method is purely local to the transit router and therefore does not require any signaling exchange with the other routers to know the state of their switching tables, particularly their state of progress in the convergence process. No synchronization between the routers is necessary, nor any particular function, except for the capability to de-encapsulate the packets, for a router which is at the termination point of a tunnel, or for a router preceding a termination point in the particular case of MPLS with the "Penultimate Hop Popping" function.

According to an aspect of the invention, if the identified last common router is the start router, then the termination point is determined as being the router adjacent to the start router on the backup path, toward the exit router.

By virtue of this aspect, if during a given cycle the identification step does not find any router, other than the start router, which is common to the backup path and to the initial tree associated with the start router, it is then necessary to determine for this cycle a tunnel that is not routed according to the shortest path, i.e. of only one hop, between the start router and the adjacent router on the backup path. In other words, the tunnel termination point determined by this cycle is the immediately neighboring router on the backup path, heading toward the exit router. Thus, the method does not stall, and can progress even if the link to the adjacent router is absent from the initial tree of the start router, for example due to its high cost.

According to an aspect of the invention, the determination method additionally comprises an addition step in which, for each termination point determined during a cycle, an instruction is added to a switching table, the instruction being an instruction for encapsulating packets destined for the exit router in a tunnel corresponding to the termination point.

By virtue of this aspect, the packets destined for the exit router, before being transmitted by the transit router, consult the switching table of the transit router and are subjected to an encapsulation in the tunnel(s), the termination point(s) of which is (are) determined by the determination method according to the invention. If several cycles of the method are executed, the packets are subjected, in reverse order of the cycles, to a sequence of encapsulations in the tunnels corresponding to the determined termination points. It is understood that the packets arrive at the exit router by passing through the termination point of each of the determined tunnels.

Thus, the packets transiting between the transit router and the exit router follow a sequence of tunnels sparing them from all the micro-loops caused by the event on the backup path.

If the number of tunnels encapsulated one in the other becomes too high for the capacities of the transit router, it is possible to use only the first N tunnels, or only the first Np and the last Nd ones, and thus partly limit the risks of micro-loops. The values of N, Np or Nd depend on the capacity of the transit router carrying out the encapsulations.

According to an aspect of the invention, the type of the tunnel forms part of a group comprising at least:
  MPLS tunnel;
  Segment Routing tunnel;
  IP tunnel.

According to an aspect of the invention, the event modifying the previous topology is referred to as a "negative event" and forms part of a group comprising:
  an increase in the cost associated with at least one link or with an IP prefix;
  disappearance of at least one link or of an IP prefix.

By virtue of this aspect, if for example a maintenance operation reduces the bitrate of a link to cause a rerouting before removal of the link, the cost associated with its use is increased in the new topology.

If a failure on a link occurs and makes it totally unusable, it no longer appears in the new topology. This can also be seen as though its cost had become too high for it to be usable.

If it is a router that is impacted by the event, it is the links attached to it which are impacted. For example, if a router breaks down and becomes unusable, all the links leading to it disappear from the new topology.

In the context of the invention, "IP prefix" must be understood as "IP prefix announced by several routers", also referred to as "multi-homed IP prefix".

According to an aspect of the invention, the event modifying the previous topology is referred to as a "positive event" and forms part of a group comprising:

a reduction in the cost associated with at least one link or with an IP prefix;

appearance of at least one link or of a multi-homed IP prefix.

By virtue of this aspect, for example if a maintenance operation increases the bitrate of the link, the cost associated with its use is reduced in the new topology.

If a maintenance or repair operation establishes or re-establishes a new link between two routers, it is added to the new topology.

If it is a router that is impacted by the event, it is the links attached to it which are impacted. For example, if a router is repaired after having been unusable, all the links which lead to it appear in the new topology.

According to an aspect of the invention, the event is a negative event and the cycles are executed fully, even if a new negative event modifies the subsequent topology before the end of said cycles.

If a second event occurs generating a new calculation of the switching tables, the topology on which the calculation of the initial trees is based is no longer that of before this second event. If the first event is of negative type, an advantageous property of the method is that the previous trees referred to as "initial" can again be used while avoiding micro-loops created by the first or by the second event. The only possible drawback is that a higher number of tunnels may be necessary.

Specifically, when the successive events are events of negative type, the part of the shortest path tree (SPT) located before the failed element(s) is not impacted by the failure or failures. When elements, links or routers are removed from the tree, the paths can only become longer, therefore the shortest paths before the failure remain the shortest paths. Therefore the part of the tree located between the root and the first element before the failure can continue to be used. This property is not dependent on the number of failures. Nevertheless, the higher the number of failures, the more the usable tree is shortened.

It is understood that the method according to the invention is very robust since its effectiveness at avoiding micro-loops also withstands many convergence procedures accompanying negative type events, even those that are very close together timewise.

However, if the first event is a positive type event (appearance of a link or reduction in the cost of a link), then it is necessary for the initial trees used for the identification of the tunnel termination point to be those corresponding to the previous topology, before the latest event, and not to a previous version of this topology, since the appearance of a new element in the tree can make it possible to find shorter paths in the whole tree. Furthermore, there is no means of identifying a part of the tree before the event since it is possible for the element added following the event not to feature in this tree.

It is to be noted that if the second event following a positive event is negative event, resorting to a Fast ReRoute solution can provide for protecting the traffic during the time for calculation of the initial trees.

By convenience, it is the distance between routers which is used in the examples above to represent the cost of the link, but these examples also apply to other types of cost.

The various aspects of the determination method which have just been described can be implemented independently from one another or in combination with one another.

The invention relates also to a device for determining a termination point of at least one tunnel in a packet switching network, the network comprising a set of routers and links between them, each link having an associated cost, the set of routers and the links forming a network topology referred to as "previous", an encapsulation point of said at least one tunnel being a transit router receiving packets destined for an exit router, an event modifying the previous topology to a network topology referred to as "subsequent", a backup path of minimum cost being calculated for the packets on the basis of the subsequent topology, the device comprising a memory and a processor suitable for, and configured for, prior to the event:

for each of the routers in the set, calculating a tree referred to as "initial", on the basis of the previous topology, said initial tree having as root said each of the routers and having as branches paths of minimum cost between the root and the other routers in the set, storing the calculated initial trees in the memory, the processor additionally being suitable for, and configured for, after the event:

selecting a router on the backup path, referred to as "start router", from the start router, to the exit router along the backup path, identifying a router, referred to as "last common router", for which all the links and routers including itself, between the start router and itself, are common to the backup path and to the initial tree associated with the start router, determining as termination point of the tunnel the identified last common router, the tunnel being intended to save the packets that are transiting between the start router and the identified last common router from entering a micro-loop caused by the event.

This device, suitable for implementing in all its embodiments the method for determining a termination point of at least one tunnel in a packet switching network, which has just been described, can be included in a transit router, or in network controller equipment.

The invention relates also to a transit router in a packet switching network, suitable for routing packets, the network comprising a set of routers and links between them, each link having an associated cost, the set of routers and the links forming a network topology referred to as "previous", the transit router receiving packets destined for an exit router, and being an encapsulation point of a tunnel, an event modifying the previous topology to a network topology referred to as "subsequent", a backup path of minimum cost being calculated for the packets on the basis of the subsequent topology, the transit router comprising a determination device in accordance with that which has just been described.

This transit router can be any equipment having knowledge of the network topology and switching packets, in particular an IP or MPLS router.

The invention relates also to a network controller able to know the topology of a packet switching network and to control switching tables in routers, the network comprising a set of routers and links between them, each link having an associated cost, the set of routers and the links forming a network topology referred to as "previous", a transit router receiving packets destined for an exit router, and being an encapsulation point of a tunnel, an event modifying the previous topology to a network topology referred to as "subsequent", a backup path of minimum cost being calculated for the packets on the basis of the subsequent topology, the network controller comprising a determination device in accordance with that which has just been described.

This network controller can for example be an SDN (Software Defined Network) controller.

The invention relates also to a computer program comprising instructions for implementing the steps of the method for determining a termination point of at least one tunnel in a packet switching network which has just been described, when this program is executed by a processor.

This program can use any programming language and be in the form of source code, object code or code intermediate between source code and object code, such as in a partially compiled form or in any other desirable form.

Another objective of the invention is an information medium readable by a computer, and including instructions of a computer program as mentioned above.

The information medium can be any entity or device capable of storing the program. For example, the medium can include a means of storage such as a ROM, for example a CD-ROM or a microelectronic circuit ROM, or else a magnetic recording means, for example a floppy disk or a hard disk.

On the other hand, the information medium can be a transmittable medium such as an electrical or optical signal, which can be conveyed via an electrical or optical cable, via radio or via other means. The program according to the invention can in particular be downloaded over an Internet type network.

Alternatively, the information medium can be an integrated circuit in which the program is incorporated, the circuit being suitable for executing or for being used in the execution of the methods in question.

4. DESCRIPTION OF THE DRAWINGS

Other advantages and features of the invention will become clearer upon reading the following description of particular embodiments of the invention, which embodiments are given by way of simple illustrative and nonlimiting examples, and from the appended drawings in which.

5. DETAILED DESCRIPTION OF AT LEAST ONE EMBODIMENT OF THE INVENTION

Hereafter in the description, example embodiments of the invention are presented, based on tunnels (tunnel case) or on tunnel segments (segment case).

The tunnels can be IP tunnels such as IP-in-IP (RFC 2003), GRE (RFC 2784), L2TP (RFC 2661) or L2TPv3 (RFC 3931) tunnels, or MPLS tunnels (RFC 3031) for example established by the LDP (RFC 5036) protocol.

The tunnel segments can be segments referred to as "SR" (Segment Routing, IETF document: "draft-ietf-spring-segment-routing"), between routers referred to as "IGP" (Interior Gateway Protocol, IETF document: "draft-ietf-isis-segment-routing-extensions", "draft-ietf-ospf-segment-routing-extensions" or "draft-ietf-ospf-ospfv3-segment-routing-extensions", depending on the type of IGP used).

It is assumed that a router knows the topology of the network, for example through IS-IS (RFC 1195), OSPFv2 (RFC 2328), OSPFv3 (RFC 5340), or BGP-LS protocols (IETF document: "draft-ietf-idr-ls-distribution").

The routers of a network and the links between them form a topology.

With respect to a given router in this topology, called root, an "SPT tree" (Shortest Path Tree) is the tree starting from the root toward each of the other routers, the branches of which follow the shortest path. In real-life communication networks, it is not the distance between two routers which matters, but the cost of the link between them. It is therefore in fact the branches following the least costly path, but for convenience of language, the term "SPT tree" is used.

In the tunnel case, it is assumed that a router is capable of using a tunnel toward any destination/router in the network. The details of implementation depend on the type of tunnel used, IP or MPLS for example.

In the segment case, an SR (Segment Routing) type router is a router suitable for using in the network one or more pre-established tunnels between any two routers of the topology, one of these routers being able to be itself. These pre-established tunnels are called segments in Segment Routing terminology.

A tunnel forces the path of a packet in the network. It is understood that an SR or non-SR router has the capacity, if the tunnel is suitably determined, to avoid, during the routing of packets which it transmits into the tunnel, the consultation of routing tables of routers intermediate between the router forming the start of the tunnel and the router forming the end of the tunnel. This is particularly beneficial when these routing tables are not synchronized with one another, which is the case notably during the routing table update phase following a modification of the topology, since all the routers do not update their routing table at the same time. A topology modification can be due to a link or router failure, a link or router repair or installation, etc.

It is during this update phase, also referred to as "convergence", that micro-loops appear, which suitably determined tunnels can avoid.

In the tunnel case, by using one or more consecutive IP tunnels, each routed according to the existing IP switching tables, it is not necessary to create specific or additional routing states. The difficulty remains in determining the list of tunnels to use consecutively, so as to follow the desired path.

In the segment case, segment routing SR provides for using tunnels without creating specific routing states in the network by combining the consecutive use of several pre-existing segments. The difficulty remains in determining the list of segments to use consecutively, so as to follow the desired path.

By virtue of, among other aspects, calculations performed before a failure, the invention provides for suitably determining these tunnels or these segments, and doing so very rapidly after the failure.

Figure 2:
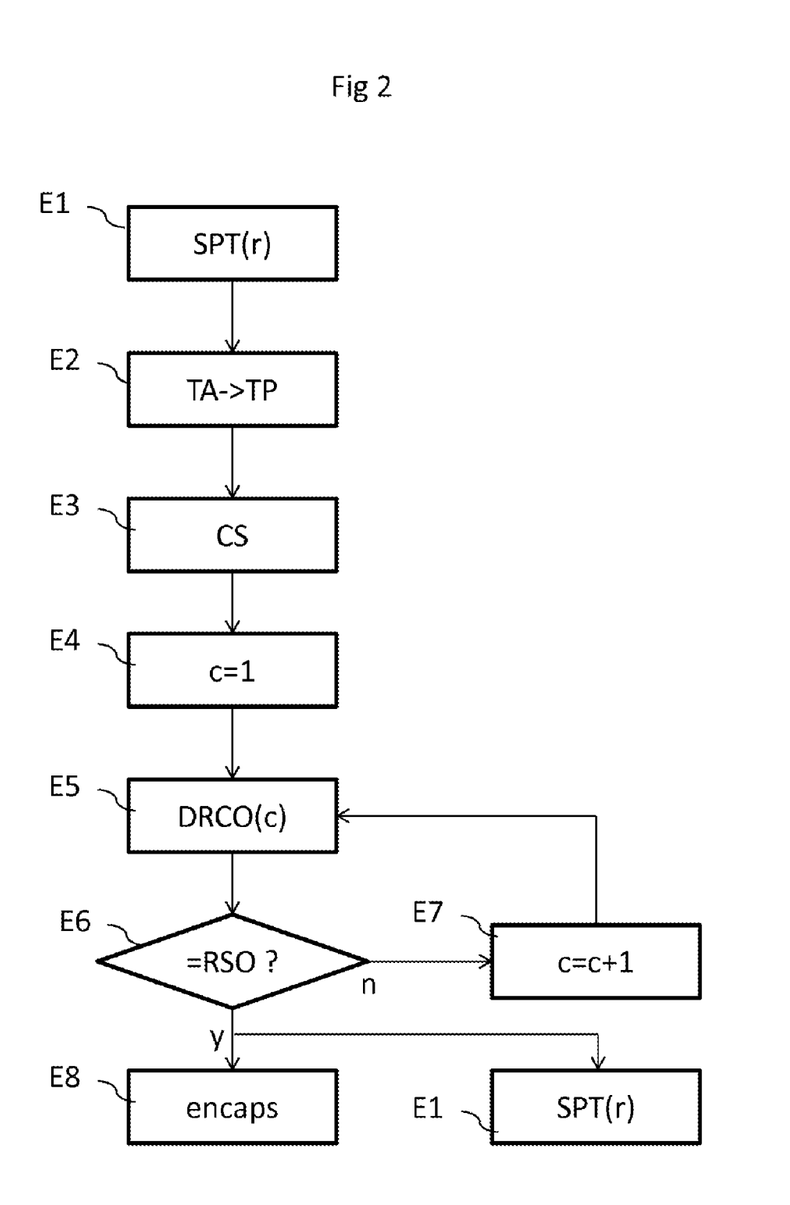
FIG. 2 presents an example implementation of the method for determining a de-encapsulation point of at least one tunnel in a packet switching network, according to a particular embodiment of the invention.

FIG. 2 presents an example implementation of the method for determining a termination point of at least one tunnel in a packet switching network, according to a particular embodiment of the invention.

This determination method can be encompassed in a larger method enabling packets to be transmitted by a transit router RTR toward an exit router RSO.

During a step E1 prior to an event, the router RTR calculates and stores the SPT tree of each of the N routers of the topology TA, denoted by SPT(r), r=1 to N.

During a step E2, an event modifies the topology TA to a topology TP, after the event. In the topology TP calculated and stored by the router RTR during this step, one or more links may have disappeared, appeared or have had their cost modified, with respect to the topology TA. The router RTR has knowledge of the change of topology for example with the aid of a known mechanism such as for example one of those mentioned earlier.

During a step E3, the router RTR calculates and stores the least costly path CS between the router RTR and the router RSO in the topology TP.

During a step E4, the router RTR sets a counter of cycles c to 1, and selects a router RDE(c) referred to as "start" as being itself, i.e. the router RTR. This has the effect of making the tunnel start from the transit router RTR which transmits the packets to the exit router RSO.

In an optional variant of step E4, the router RTR selects as start router RDE(c=1) during the first cycle the router adjacent to the router RTR on the backup path. The routing on the link between the router RTR and its immediate neighbor on the backup path is not affected by the event, and shifting the start of the tunnel, the termination point of which is to be determined, by one router hop can provide for heading further along in the backup path CS and minimizing the total number of tunnels necessary.

During a step E5, the router RTR identifies and stores the router DRCO(c), which is the last router common to the path CS and to the SPT tree of the router RDE(c), starting from the router RDE(c) and heading to the router RSO.

In the tunnel case, one of the IP addresses, or the IP address of the router DRCO(c), is the destination of the tunnel starting at the transit router.

In the segment case, the router DRCO(c) is the termination point of a segment starting at the start router. This segment is the destination segment DRCO(c), which can be a "node segment", i.e. a "prefix segment" identifying a node, or a "prefix segment".

In the particular case in which DRCO(c) is equal to RDE(c), there is no tunnel or segment of shorter path for advancing along the path CS. In this case, the router RDE(c) is positioned at the router neighboring DRCO(c) on the path CS and a tunnel or a segment of only one hop is used, for crossing only one link.

In the tunnel case, the IP address of the router DRCO(c) is used as the destination address on the interface common to the routers RDE(c) and DRCO(c).

In the segment case, an adjacency segment is used.

During a step E6, the router RTR determines for the current cycle "c" that the router DRCO(c) is the termination point, for example by adding an identifier of the router DRCO(c) to a list of termination points. The router RTR then checks whether the router DRCO(c) is the router RSO. If this is the case, the list of termination points is entirely determined since the exit router RSO has been reached. The router RTR then executes an encapsulation step E8, described later.

If this is not the case, during a step E7 the router RTR selects the router RDE(c+1) referred to as "start" as being the router DRCO(c), increments the counter of cycles counter c, and goes back to step E5. This enables a new cycle for determining the next termination point to be started.

During step E8, the router RTR encapsulates the packets,
in the tunnel case, in the "c" tunnels determined during the cycles of the method of which the steps have just been described,
and in the segment case, in the tunnel formed by the "c" segments determined during the cycles of the method of which the steps have just been described.

In the case in which the router RTR has received IP packets, the last segment is not necessary since the destination IP address is sufficient. In the case in which the router RTR has received MPLS packets, this last segment is necessary to provide continuity of the segment/label corresponding to the label of the packet received.

In the tunnel case, the tunnels are used successively in reverse order to that of the determination of their termination point.

In the segment case, the segments are used successively in the same order as that of the determination of their termination point.

Figure 4:
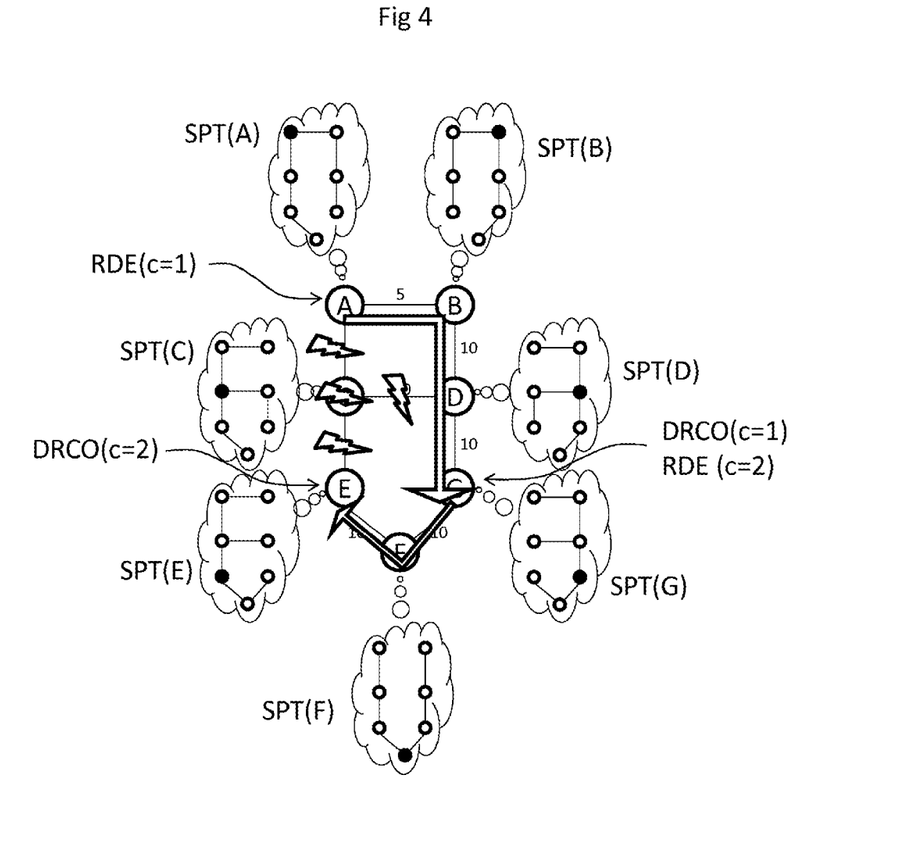
FIG. 4 presents cycles for determining a de-encapsulation point according to an aspect of the determination method, using as example the topology already used in FIG. 1.

In the tunnel case, for example in FIG. 4, two cycles have been necessary; the first tunnel used is destined for the router DRCO(1) (the router G) and the second tunnel is destined for the router DRCO(2) (the router E). On the packets received, the router RTR will first encapsulate the packet in the tunnel destined for the router E, and then encapsulate the resulting packet in the tunnel destined for the router G. Thus, the packet will first be routed to the router G using this first tunnel. Then, once it has arrived at the router G, the first tunnel will be terminated by de-encapsulating the internal packet. This internal packet is the packet of the tunnel destined for the router E.

In the segment case, still taking FIG. 4 as an illustrative example, two cycles have been necessary: the first segment is determined as being destined for the router DRCO(1), i.e. the router G, and the second segment is determined as being destined for the router DRCO(2), i.e. the router E.

In the case in which the router RTR has received MPLS packets, this results in popping the received "label" and pushing two "labels" onto the packet: the "outer" label is that of the first segment, and the "inner" label is that of the second segment.

In the case in which the router RTR transmits IP packets, it programs the following entry in its IP switching table (FIB):

IP(E)→PUSH (label of the first segment toward G)

In the case in which the router RTR transmits MPLS packets, it programs the following entry in its MPLS switching table (LFIB):

Label (E)→SWAP (label of the second segment toward E)+PUSH (label of the first segment toward G).

The SWAP operation is functionally identical to popping the received label and pushing another one.

In anticipation of a future event modifying the topology TP, as soon as the last cycle for determining termination points comprising steps E5, E6 and E7 is ended, i.e. as soon as the termination point is determined as being the exit router RSO, the router RTR recalculates and re-stores the SPT tree of each of the N routers, denoted by SPT(r), r=1 to N, but this time on the basis of the topology TP which has become the previous topology relative to the future event, during a return to step E1. It must be noted that this return to step E1, which is a preparation step, in anticipation of a next failure for example, is less urgent than all the previous steps of which the aim is to react as fast as possible to the change of topology from TA to TP.

This enables the router RTR to be ready, as soon as a new event arises, to again determine suitable termination points simply by executing the same steps E2 to E8. Specifically, one of the advantages of the method according to the invention is that the resources and calculation times are particularly required by step E1 (which runs in anticipation of a failure and therefore in general before the failure), which minimizes them for steps E2 to E8, which are faster and less resource-consuming.

However it can arise that this new event modifying the topology TP occurs while the method is in progress. Several cases can arise:

If the number of routers in the network is small, or if the processor of the transit router is powerful, a step for recalculating the SPT trees before resuming the method might not be detrimental.

If the previous event modifying the topology TA to TP was a negative type event (failure of link(s), failure of node(s), increase in the cost of link(s)), then it is not necessary to recalculate the SPT trees since the calculated termination points remain valid.

If the previous event was a positive type event ((re-)establishment of (a) link(s), of a node, reduction in the cost of link(s)), then it is necessary to recalculate the SPT trees in order to be certain of avoiding all the micro-loops. Without this recalculation, a few micro-loops may possibly be avoided, but not all with certainty.

It is to be noted that after the passage of a duration that is predetermined and sufficiently long for the convergence of the routing tables of all the routers impacted by the latest event to be accomplished, the transit router RTR can remove the encapsulations of the packets in the tunnels or segments, the termination points of which have been determined by the method.

Figure 3:
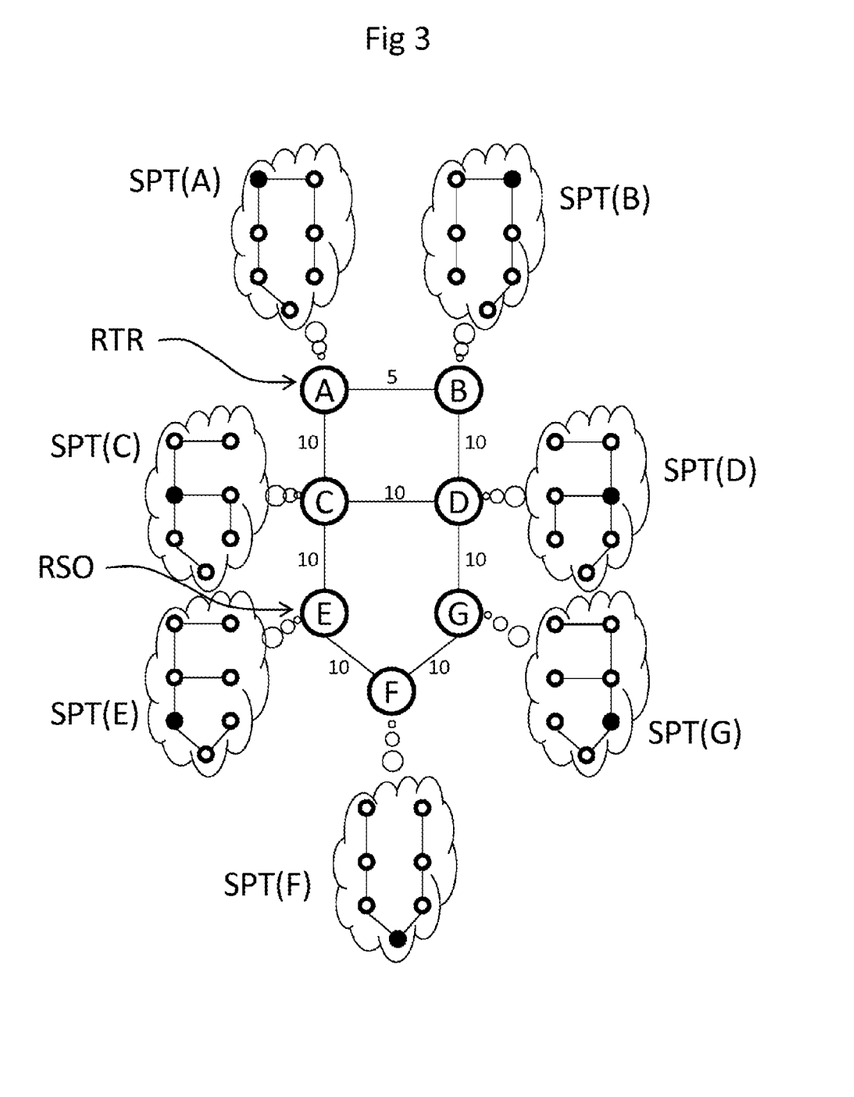
FIG. 3 presents a step of the determination method, the step for calculating and storing SPT trees, using as example the topology already used in FIG. 1.

FIG. 3 presents the step E1 for calculating and storing SPT trees, using as example the topology already used in FIG. 1.

The transit router RTR is the router A and the exit router RSO is the router E. The router RTR calculates the trees SPT(r), r=A, B, C, D, E, F, G. Each SPT tree is calculated and stored by the router RTR, i.e. by the router A, but for convenience, in FIG. 3, the SPTs are illustrated by a cloud connected by bubbles to its root router, itself illustrated by a black dot in the cloud, the other routers being illustrated by hollow circles.

There are several ways to store the SPT trees. To effectively store these data structures which can consume a large quantity of memory for a large network, and which are capable of being frequently updated, vector methods exist for storing only one generic graph representing the topology TA of the router network. For example, the bit "i" of a link is set to 1 when this link is used by SPT(i), or is set to 0 when this link is not used by SPT(i). As such, in a network of R routers, it is not necessary to store R tree structures, but only one graph structure with a vector of R bits per link.

FIG. 4 presents the cycles for determining a termination point according to an aspect of the method using as example the topology already used in FIG. 1.

The transit router RTR is the router A and the exit router RSO is the router E. In this example, the router C fails during step E2. Not only is the router C no longer present in the new topology TP after the event, but the links C-A, C-D and C-E also are no longer present in the new topology TP.

During the step E3, the backup path CS, not illustrated, is calculated and stored. The path CS is the path of minimum cost between the routers RTR and RSO in the topology TP. In FIG. 4 as in FIG. 3, the numbers 5, 10, 10 etc. are example values representing the cost of the various links. The path CS starts at the router A, and passes through the routers B, D, G and F, in that order, to end at the router E.

During step E4, the start router RDE for the first determination cycle (c=1) is the router RTR, i.e. the router A.

During step E5 of the first cycle, starting from the router RDE(c=1), to the exit router RSO, the router RTR identifies the router DRCO(c=1). DRCO(c=1) is the last router on the backup path CS, between RDE(c=1) and RSO, for which all the links and routers including DRCO(c=1), between the router RDE(c=1) and DRCO(c=1), are common to the backup path CS and to the tree SPT(RDE(c=1)). That is, in FIG. 4, common to the path A-B-D-G-F-E and to the tree SPT(A). In this example and for this first cycle, this is the router G.

During step E6, the router RTR checks whether the router DRCO(c=1) is the exit router RSO. This is not the case since it is the router G, and not the router E, and therefore the method advances to step E7 and to the second determination cycle.

During this step E7, the start router RDE (c=2) is the router DRCO(c=1), i.e. the router G.

During step E5 of the second cycle which follows step E7, starting from the router RDE(c=2), to the exit router RSO, the router RTR identifies the router DRCO(c=2). DRCO (c=2) is the last router on the backup path CS, between RDE(c=2) and RSO, for which all the links and routers including DRCO(c=2), between the router RDE(c=2) and DRCO(c=2), are common to the backup path CS and to the tree SPT(RDE(c=2)). That is, in FIG. 4, common to the path A-B-D-G-F-E and to the tree SPT(G). In this example and for this cycle, this is the router E.

During step E6 of the second cycle, the router RTR checks whether the router DRCO(c=2) is the exit router RSO. This is the case since it is the router E, i.e. the router RSO, therefore the determination cycles are stopped and the method advances to step E8.

In the tunnel case, it is to be noted that if the packets received by the router RTR are IP packets, it is not necessary to use the last tunnel since the IP address of these packets provides for determining the destination.

When the number of cycles is high, therefore when the method determines a large number of termination points, the router RTR can be incapable of encapsulating a packet in all the corresponding tunnels or tunnel segments.

In a variant of step E8, not all the termination points determined by the method are used. Using the first N tunnels or tunnel segments provides for avoiding micro-loops on the part of the backup path used by these N tunnels or tunnel segments. Even if micro-loops are not avoided over the entire backup path, the result is a good compromise.

In the segment case, if the router RTR receives MPLS packets, it must push the last segment since it is the latter which indicates the destination, i.e. the exit router RSO. It is also to be noted that if the router RTR receives IP packets, the last segment is not necessary since the IP address provides for determining the destination.

Figure 5:
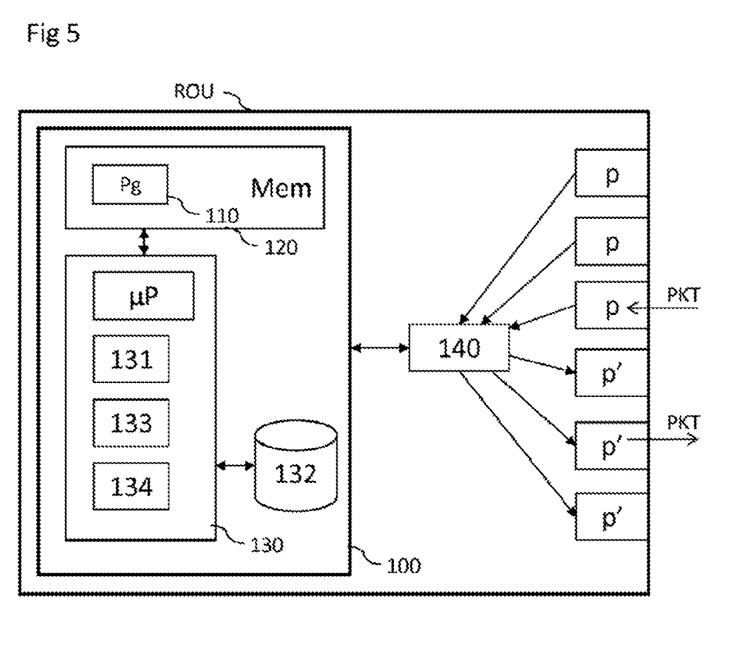
FIG. 5 presents an example structure of a device for determining a de-encapsulation point of at least one tunnel in a packet switching network, according to an aspect of the invention.

With reference to FIG. 5, there is now described an example structure of a determination device, according to an aspect of the invention.

The determination device 100 implements the determination method, of which various embodiments have just been described.

Such a device 100 can be implemented in a router suitable for routing packets in packet switching communication networks.

For example, the device 100 comprises a processing unit 130, equipped for example with a microprocessor μP, and driven by a computer program 110, stored in a memory 120 and implementing the determination method according to the invention. Upon initialization, the code instructions of the computer program 110 are for example loaded into a RAM memory before being executed by the processor of the processing unit 130.

Notably, such a device 100 comprises:
a calculation module 131, suitable for and configured for calculating an SPT tree referred to as "initial", on the basis of a previously stored topology, said initial tree having as root one of the routers of the topology and having as branches paths of minimum cost between the root and the other routers of the topology,
a memory 132, suitable for and configured for storing calculated SPT trees,
an identification module 133, suitable for and configured for identifying a router on the backup path, referred to as "last common router", for which all the links and routers including this last common router, between a start router and this last common router, are common to a backup path to an exit router and to an SPT tree associated with the start router,
a determination module 134, suitable for and configured for determining as tunnel or tunnel segment to use, the one which provides for heading from the start router to the identified last common router along the backup path, in order to save packets that are transiting to the identified last common router from entering a micro-loop caused by an event that has modified the topology and has determined the backup path.

The modules above can be hardware or software modules, which may or may not be integrated in the processor of the processing unit 130.

The device 100 can be included in a router ROU comprising a module 140 for switching and encapsulating packets PKT which are received via input ports p, and encapsulated and then transmitted via output ports p'.

The example embodiments of the invention which have just been described are only some of the conceivable embodiments. Even if these examples use only a reduced number of routers and links for the convenience of demonstrations, the invention is designed to effectively solve the problem of micro-loops in a packet switching network that can comprise a large number of routers and links, without impacting the operation of the routers.

By way of example, if 1 to 5 μs per node are necessary to calculate an SPT tree, the step for calculating all the SPT trees in a network of 1000 routers will take 1 to 5 s. This implies that if several failures or other events impacting the topology occur in succession, the method operates optimally despite these events, as long as the interval between them remains longer than 5 seconds, knowing that it operates at least partially even if the interval is shorter.

The invention claimed is:

1. A determination method for determining a termination point of at least one tunnel or tunnel segment in a packet switching network, the network comprising a set of routers and links between routers of the set, each link having an associated cost, the set of routers and the links forming a network topology referred to as "a previous topology", a transit router included in the set of routers receiving packets destined for an exit router included in the set,
an event modifying the previous topology to a network topology referred to as "a subsequent topology",
a backup path between the transit router and the exit router being calculated for the packets on the basis of the subsequent topology,
wherein the method comprises the following act performed prior to the event by a processing device in the transit router or connected to the transit router:
for each of the routers in the set, calculating a respective tree referred to as "an initial tree", on the basis of the previous topology, said initial tree having a root corresponding to the respective router and having branch paths of minimum cost between the root and the other routers in the set,
the method additionally comprising at least one cycle of the following acts performed after the event by the processing device:
selecting a router on the backup path, referred to as "a start router",
from the start router, to the exit router along the backup path, identifying a router, referred to as "last common router", for which all the links and routers including the last common router, between the start router and the last common router, are common to the backup path and to the initial tree associated with the start router, and, if this last common router is different from the start router, determining the termination point of the tunnel or tunnel segment as being the identified last common router, the tunnel or tunnel segment saving the packets that are transiting between the start router and the identified last common router from entering a micro-loop caused by the event.

2. The determination method as claimed in claim 1, wherein the backup path is of minimum cost.

3. The determination method as claimed in claim 1, wherein the start router selected during the first cycle is the transit router.

4. The determination method as claimed in claim 1, wherein the start router selected during the first cycle is a router adjacent to the transit router on the backup path.

5. The determination method as claimed in claim 1, wherein the selected start router is the termination point determined during the previous cycle, if the cycle is not the first of the at least one cycle.

6. The determination method as claimed in claim 1, wherein, if the identified last common router is the start router, then the termination point is determined as being the router adjacent to the start router on the backup path, toward the exit router.

7. The determination method as claimed in claim 1, additionally comprising an addition act wherein, for each termination point determined during a cycle, an instruction is added to a switching table, the instruction being an instruction for encapsulating packets destined for the exit router in a tunnel corresponding to the termination point.

8. The determination method as claimed in claim 1, wherein the type of the tunnel forms part of a group consisting of:
MPLS tunnel;
Segment Routing tunnel;
IP tunnel.

9. The determination method as claimed in claim 1, wherein the event modifying the previous topology is referred to as a "negative event" and forms part of a group consisting of:
an increase in a cost associated with at least one link or with an IP prefix;
disappearance of at least one link or of an IP prefix.

10. The determination method as claimed in claim 1, wherein the event modifying the previous topology is referred to as a "positive event" and forms part of a group consisting of:
a reduction in the cost associated with at least one link or with an IP prefix;
appearance of at least one link or of a multi-homed IP prefix.

11. The determination method as claimed in claim 9, wherein the event is a negative event and the at least one cycle is executed fully, even if a new negative event modifies the subsequent topology before the end of said at least one cycle.

12. A device for determining a termination point of at least one tunnel in a packet switching network, the network comprising a set of routers and links between routers of the set, each link having an associated cost, the set of routers and the links forming a network topology referred to as "a previous topology",
an encapsulation point of said at least one tunnel being a transit router receiving packets destined for an exit router,
an event modifying the previous topology to a network topology referred to as "a subsequent topology",
a backup path of minimum cost being calculated for the packets on the basis of the subsequent topology,
wherein the device is implemented in the transit router or is connected to the transit router and comprises:
a processor; and
a memory storing instructions, which when executed by the processor configure the processor to perform the following acts:
prior to the event:
for each of the routers in the set, calculating a respective tree referred to as "an initial tree", on the basis of the previous topology, said initial tree having a root corresponding to the respective router and having branch paths of minimum cost between the root and the other routers in the set,
storing the calculated initial trees in a database, and
after the event:
selecting a router on the backup path, referred to as "a start router",
from the start router, to the exit router along the backup path, identifying a router, referred to as "last common router", for which all the links and routers including the last common router, between the start router and the last common router, are common to the backup path and to the initial tree associated with the start router,
determining as termination point of the tunnel the identified last common router, the tunnel saving the packets that are transiting between the start router and the identified last common router from entering a micro-loop caused by the event.

13. The device of claim 12, wherein the device is comprised in the transit router.

14. A non-transitory computer-readable recording medium comprising instructions stored thereon, which when executed by a processor of a transit router, configure the transit router to determine a termination point of at least one tunnel or tunnel segment in a packet switching network, the network comprising a set of routers and links between routers of the set, each link having an associated cost, the set of routers and the links forming a network topology referred to as "a previous topology",
the transit router being included in the set of routers and receiving packets destined for an exit router included in the set,
an event modifying the previous topology to a network topology referred to as "a subsequent topology",
a backup path between the transit router and the exit router being calculated for the packets on the basis of the subsequent topology,
wherein the transit router performs acts comprising:
prior to the event:
for each of the routers in the set, calculating a respective tree referred to as "an initial tree", on the basis of the previous topology, said initial tree having a root corresponding to the respective router and having branch paths of minimum cost between the root and the other routers in the set, and
after the event:
selecting a router on the backup path, referred to as "a start router",
from the start router, to the exit router along the backup path, identifying a router, referred to as "last common router", for which all the links and routers including the last common router, between the start router and the last common router, are common to the backup path and to the initial tree associated with the start router, and, if this last common router is different from the start router, and
determining the termination point of the tunnel or tunnel segment as being the identified last common router, the tunnel or tunnel segment saving the packets that are transiting between the start router and the identified last common router from entering a micro-loop caused by the event.

* * * * *